(12) United States Patent
Weiner et al.

(10) Patent No.: US 7,926,095 B1
(45) Date of Patent: Apr. 12, 2011

(54) EFFICIENT AUTHENTICATION SYSTEM FOR PRIMARY AND SECONDARY SERVERS

(75) Inventors: Keith Weiner, Queen Creek, AZ (US); Charles Rowe, Pheonix, AZ (US); Frederick H. Scott, Phoenix, AZ (US)

(73) Assignee: Avaya Inc., Basking Ridge, NJ (US)

( * ) Notice: Subject to any disclaimer, the term of this patent is extended or adjusted under 35 U.S.C. 154(b) by 984 days.

(21) Appl. No.: 11/800,152

(22) Filed: May 4, 2007

(51) Int. Cl.
  *H04L 29/06* (2006.01)
(52) U.S. Cl. .............................. 726/7; 713/168; 713/183
(58) Field of Classification Search .................. None
  See application file for complete search history.

(56) References Cited

U.S. PATENT DOCUMENTS

| | | | |
|---|---|---|---|
| 5,497,421 A * | 3/1996 | Kaufman et al. ............ 713/156 |
| 5,689,566 A | 11/1997 | Nguyen |
| 6,161,185 A | 12/2000 | Guthrie et al. |
| 6,339,423 B1 | 1/2002 | Sampson et al. |
| 6,668,322 B1 | 12/2003 | Wood et al. |
| 6,920,559 B1 | 7/2005 | Nessett et al. |
| 6,996,718 B1 | 2/2006 | Henry et al. |
| 7,055,032 B2 | 5/2006 | Sandhu et al. |
| 7,089,585 B1 | 8/2006 | Dharmarajan |
| 7,194,764 B2 | 3/2007 | Martherus et al. |
| 7,197,765 B2 | 3/2007 | Chan et al. |
| 7,210,163 B2 | 4/2007 | Stoll |
| 7,210,169 B2 | 4/2007 | Smith et al. |
| 7,370,351 B1 * | 5/2008 | Ramachandran et al. ........ 726/8 |
| 2002/0157017 A1 * | 10/2002 | Mi et al. ........................ 713/200 |
| 2003/0028495 A1 * | 2/2003 | Pallante ........................ 705/78 |
| 2003/0105981 A1 | 6/2003 | Miller et al. |
| 2004/0015724 A1 * | 1/2004 | Pham et al. .................... 713/201 |
| 2004/0249961 A1 * | 12/2004 | Katsube et al. ............... 709/229 |
| 2005/0177750 A1 * | 8/2005 | Gasparini et al. ............. 713/201 |
| 2007/0016663 A1 * | 1/2007 | Weis .............................. 709/223 |

\* cited by examiner

*Primary Examiner* — Minh Dinh
*Assistant Examiner* — David Le
(74) *Attorney, Agent, or Firm* — Withrow & Terranova, PLLC

(57) ABSTRACT

An efficient authentication method for providing a user access to a primary server and at least one secondary server. An efficient authentication system for primary and secondary servers for providing secure access to a user.

26 Claims, 12 Drawing Sheets

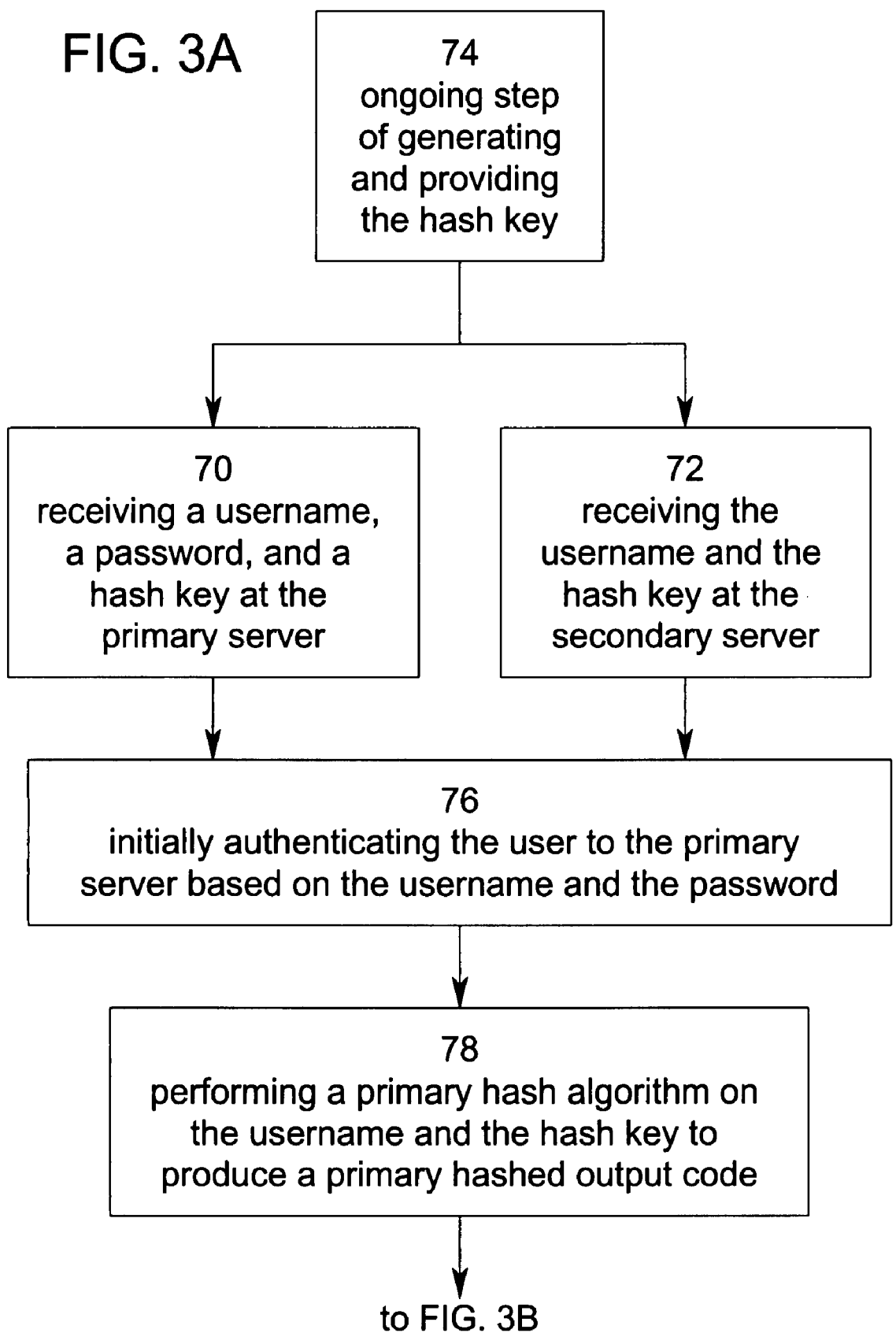

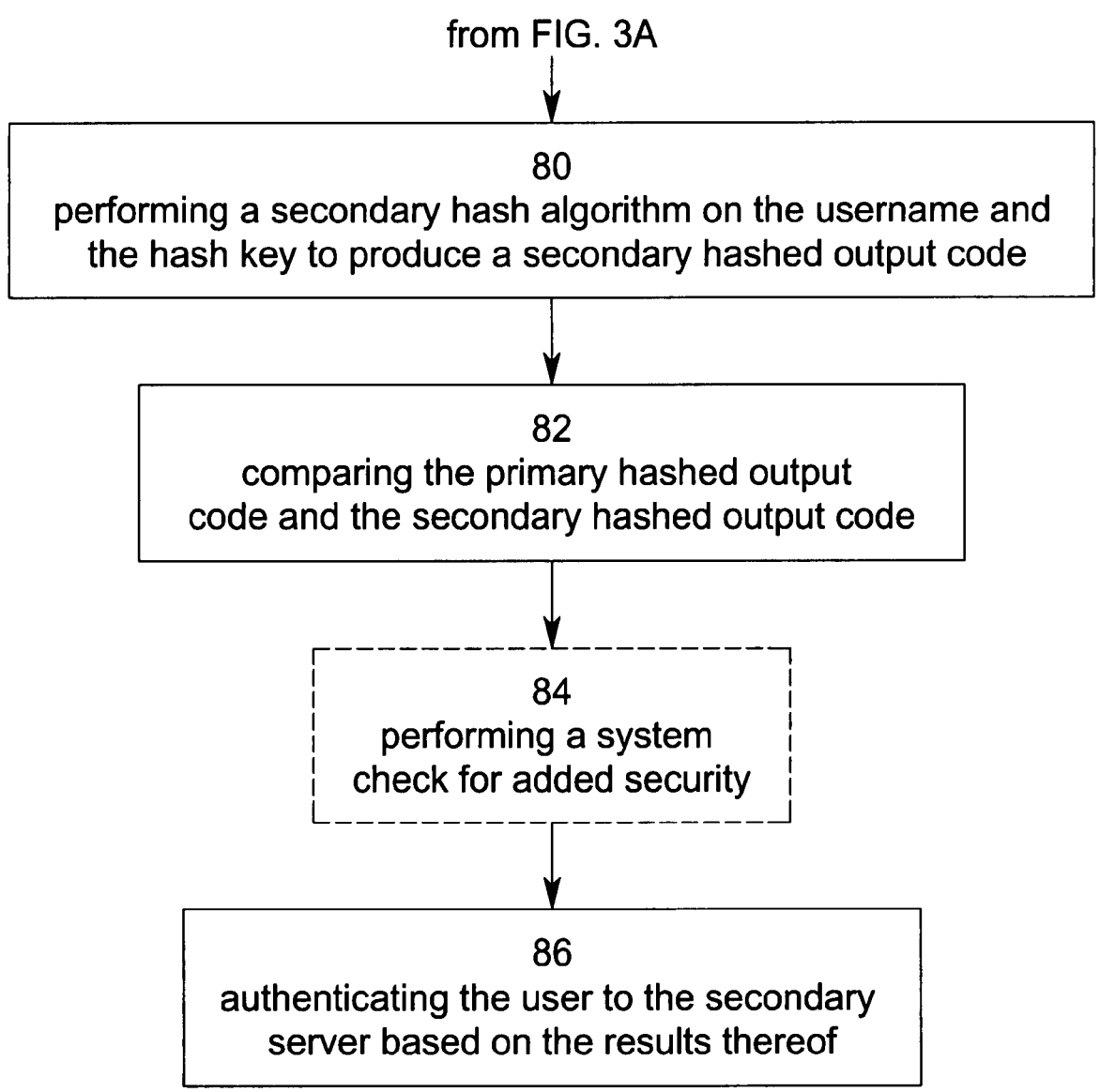

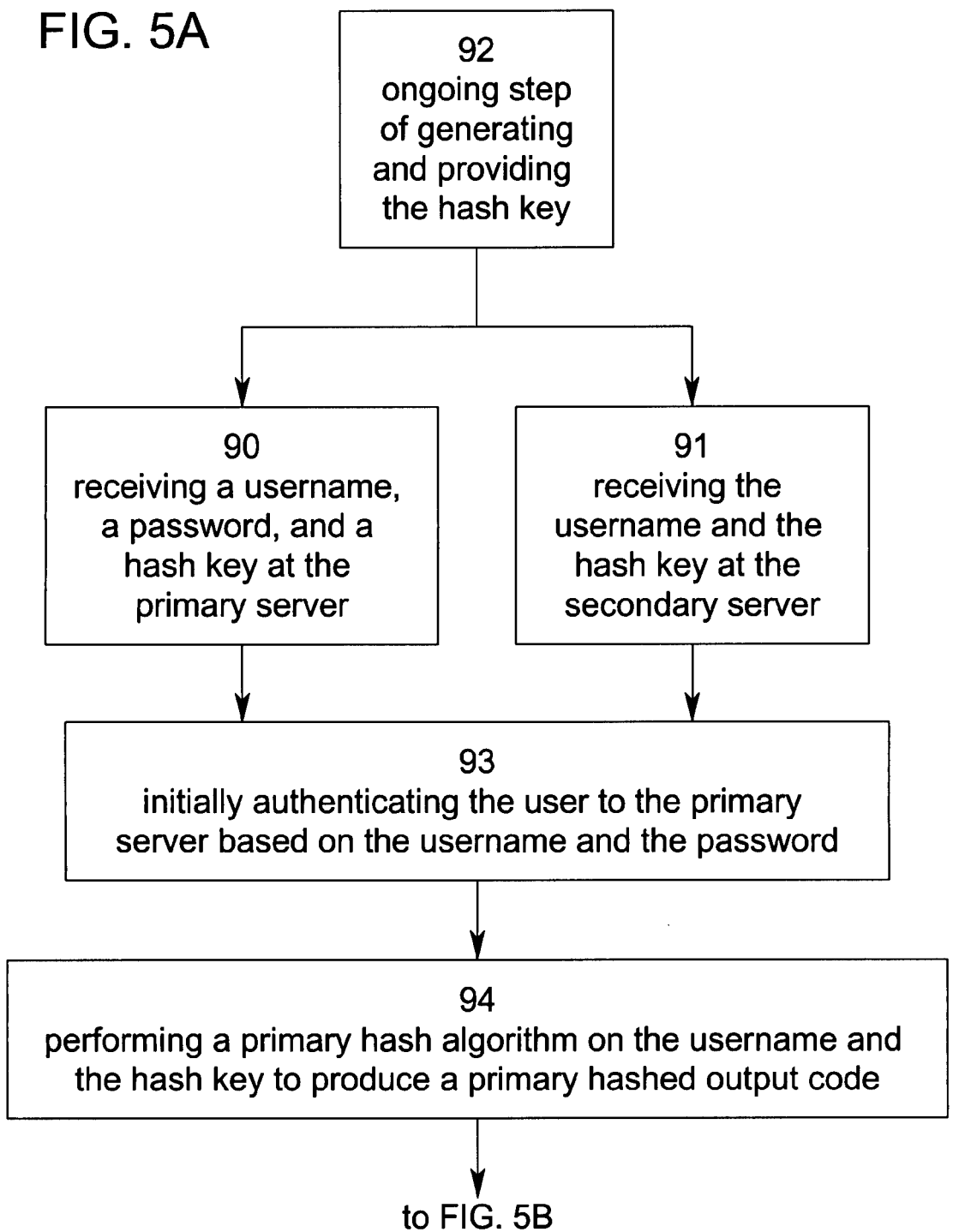

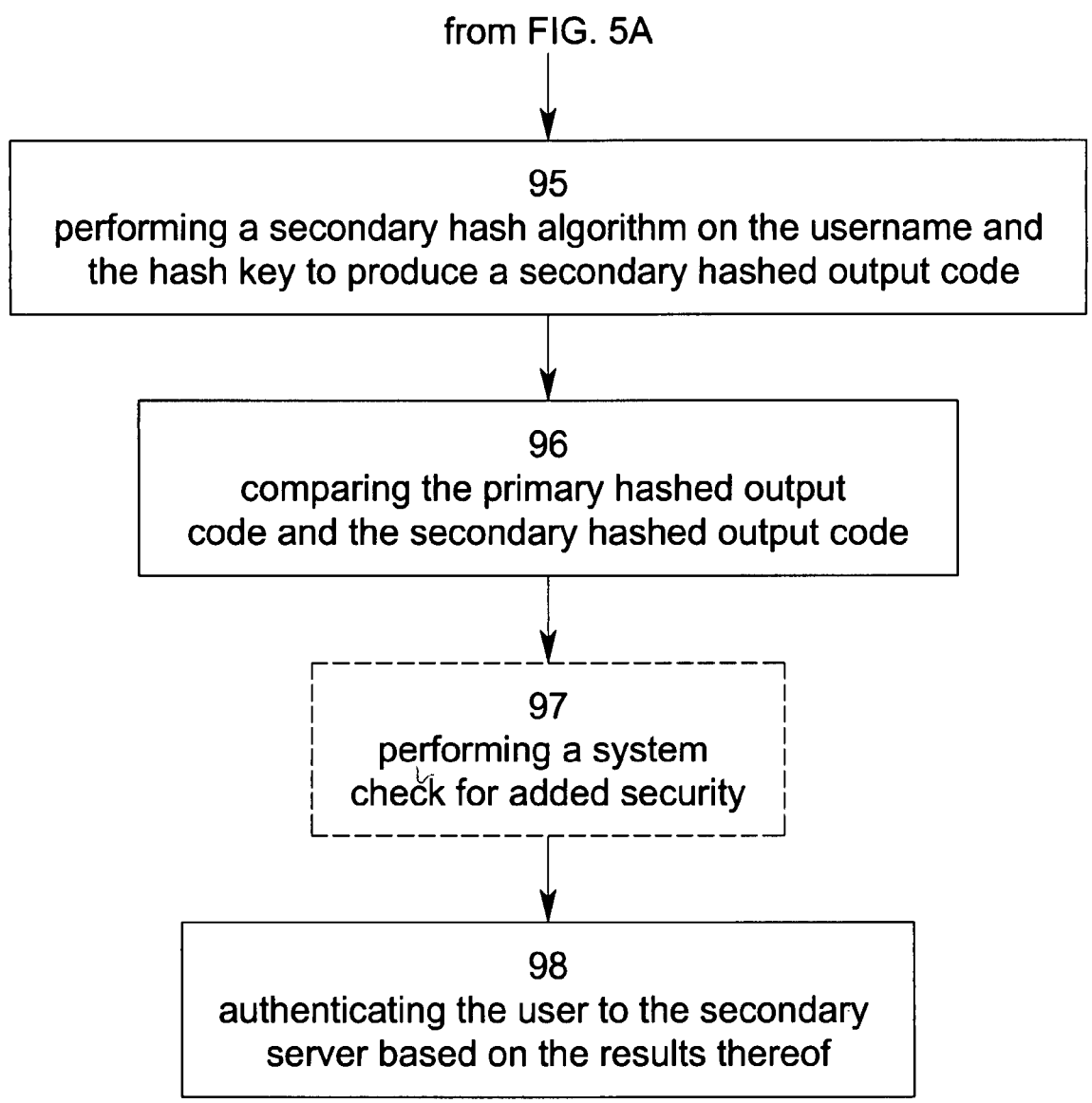

FIG. 10

Application/Client software

Automatic Login to Primary Server and Secondary Server password: ☐ username: ☐

[ authenticate ]

FIG.11

Application/Client software

Login to Primary Server password: ☐ username: ☐

[ authenticate ]

FIG. 12

Application/Client software

Automatic Login to Secondary Server

☐ for secondary server option check box

| yes | no |

FIG. 13

Application/Client software

Manual Login to Secondary Server hashed output code [        ]

login

FIG. 14

Application/Client software

Login to Primary Server and Optional Additional Servers password: ☐ username: ☐

☐ for secondary server option check box
☐ for additional server(s) option check box authenticate

EFFICIENT AUTHENTICATION SYSTEM FOR PRIMARY AND SECONDARY SERVERS

COPYRIGHT NOTICE

A portion of the disclosure of this patent document contains material which is subject to copyright protection. The copyright owner has no objection to the facsimile reproduction of the patent disclosure, as it appears in the Patent and Trademark Office patent files or records, but otherwise reserves all copyright rights whatsoever.

BACKGROUND OF INVENTION

The present invention is directed to an efficient authentication method, apparatus, and/or system for primary and secondary servers and, more specifically, to an efficient authentication system for obtaining access to at least one secondary server without using a user account database.

One known basic authentication method for obtaining access to a software application and/or server is based on usernames and passwords being compared to entries stored in a user account database. At login, the user provides a username and a password. For purposes of this disclosure, the username and password are any two variables (e.g. numbers, letters, and/or characters) or strings of variables associated with the user. For example, the username could be selected by the user, could be assigned to the user, or could be a determinable variable (e.g. an e-mail address, a social security number, a phone number, a birth date, and coordinates). Similarly, the password could be selected by the user, could be assigned to the user, or could be a determinable variable (e.g. an e-mail address, a social security number, a phone number, a birth date, and coordinates). The username and password are sent to the server. The server permits the login if there is a match to the password stored in the user account database for the specified username.

Another known authentication method for obtaining access to a software application and/or server adds a hashing element. A hash (also called a "message digest") is an output code (e.g. a string of numbers, letters, and/or characters) generated from input data (e.g. a password or code that may include a string of numbers, letters, and/or characters). The hashed output code is generally smaller than the input data, and is generated by a formula in such a way that it is extremely unlikely that some other input will produce the same hashed output code. A hash algorithm (or function) is a reproducible method that turns input data (e.g. a password or code) into an output code that may serve as a digital "fingerprint" of the input data. The hash algorithm changes (e.g. substitutes, transposes, calculates, and/or generates) the input data to create such fingerprints. In one known method, a hash algorithm is performed using a one-way cryptographic algorithm (i.e. it cannot be unencrypted), a hash key (a parameter to the algorithm), and an ephemeral datum (e.g. current time). Cryptographic hash algorithms add security properties so that the hashed output codes are suitable for use as a primitive in various information security applications, such as authentication. In a hash authentication method, the passwords are the input data that are hashed and stored in a user account database as hashed output codes. At login, the user inputs a username and a password. Using a hash algorithm, the password is hashed, preferably on the user's client device (e.g. computer), into a hashed output code (the hashed password). The username and the hashed password are sent to the server. The server permits the login if there is a match to the hashed password stored in the user account database for this username. One advantage of a hash authentication method is increased security. A hacker who monitors the data stream to the server, or who compromises the server database, will not be able to get the user's password. Further, the database administrator will not be able to discover the user's password even if he has the hashed output code.

One limitation of known authentication methods (e.g. the "basic authentication method" and the "hash authentication method") is that there has to be a database of user accounts (e.g. usernames and passwords). In many applications and/or systems, provisioning this user account database is acceptable. Other applications and/or systems can leverage an existing user account database such as LDAP (Lightweight Directory Access Protocol). For some applications and/or systems, however, it is not desirable to provision a separate user account database. For example, in an application and/or system such as adding voice servers to existing applications like games, social networks, or collaboration platforms, it is not desirable to provision a separate user account database. One reason it may not be desirable to provision a separate user account database is because the voice server is provided as a service by a separate entity (e.g. company) than the game developer or provider of the social network or collaboration platform. Provision of a separate user account database to a separate entity may present security issues. Another reason it may not be desirable to provision a separate user account database is because of space (e.g. memory) issues. Yet another reason it may not be desirable to provision a separate user account database is because of the bandwidth issues that arise when a massive amount of data is transmitted between systems.

BRIEF SUMMARY OF THE INVENTION

The present invention is directed to an efficient authentication method, apparatus, and/or system for primary and secondary servers and, more specifically, to an efficient authentication system for obtaining access to at least one secondary server without using a user account database.

An efficient authentication method for providing a user access to a primary server and at least one secondary server includes the steps of: receiving a username, a password, and a hash key at the primary server; receiving the username and the hash key at the at least one secondary server; initially authenticating the user to the primary server based on the username and the password; performing a primary hash algorithm on the username and the hash key to produce a primary hashed output code; performing a secondary hash algorithm on the username and the hash key to produce a secondary hashed output code; comparing the primary hashed output code and the secondary hashed output code; and authenticating the user to the at least one secondary server based on the results thereof. The method may also include the step of providing the primary hashed output code to the at least one secondary server directly or indirectly (via a client device). It should be noted that these steps may be performed in alternative orders.

An efficient authentication system for primary and secondary servers for providing secure access to a user may include: a primary server and a secondary server. The primary server preferably has (which includes having access to) a primary hash algorithm module and an initial authentication module for authenticating the user based on a supplied username and password. The secondary server preferably has (which includes having access to) a secondary hash algorithm module and a hashed output compare module. The primary server and the secondary server are in a communicative relationship.

The primary hash algorithm module performs a provided hash function on the username and a hash key to produce a primary hashed output code. The secondary hash algorithm module performs the same hash function on the username and the provided hash key to produce a secondary hashed output code. The hashed output compare module compares the primary hashed output code and the secondary hashed output code and authenticates the user based on the results thereof.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3A and FIG. 3B show a flow chart of a first simplified exemplary embodiment of a method of the present invention.

FIG. 5A and FIG. 5B show a flow chart of a secondary simplified exemplary embodiment of a method of the present invention.

FIG. 10 shows an exemplary initial screen/window for a first preferred implementation of the present invention in which the application/client software for the user automatically logs into both the primary server and the secondary server.

FIG. 11 shows an exemplary initial screen/window that may be used in combination with the exemplary screen/window of FIG. 12 to show a second preferred implementation of the present invention and with the exemplary screen/window of FIG. 13 to show a third preferred implementation of the present invention.

FIG. 12 shows an exemplary secondary screen/window to which a user is directed in the second preferred implementation of the present invention, the screen/window presenting the user with the option of logging into the secondary server.

FIG. 13 shows an exemplary secondary screen/window to which a user is directed in the third preferred implementation of the present invention, the screen/window presenting the user with the option of manually logging into the secondary server.

FIG. 14 shows an exemplary initial screen/window for a fourth preferred implementation of the present invention in which the user automatically logs into the primary server and, if the client selects the option, will automatically log into the secondary server and/or additional servers.

DETAILED DESCRIPTION OF THE INVENTION

The present invention is directed to an efficient authentication method, apparatus, and/or system for obtaining access to at least one application and/or server without requiring the use of a database of user accounts (e.g. usernames and passwords). The present invention (1) avoids the need for duplicating essentially the same user account database across multiple applications and/or servers, (2) avoids the need for trust between two separate companies, and (3) avoids the bandwidth to provision and de-provision user account databases on multiple applications and/or servers 20, 22.

Figure 1:
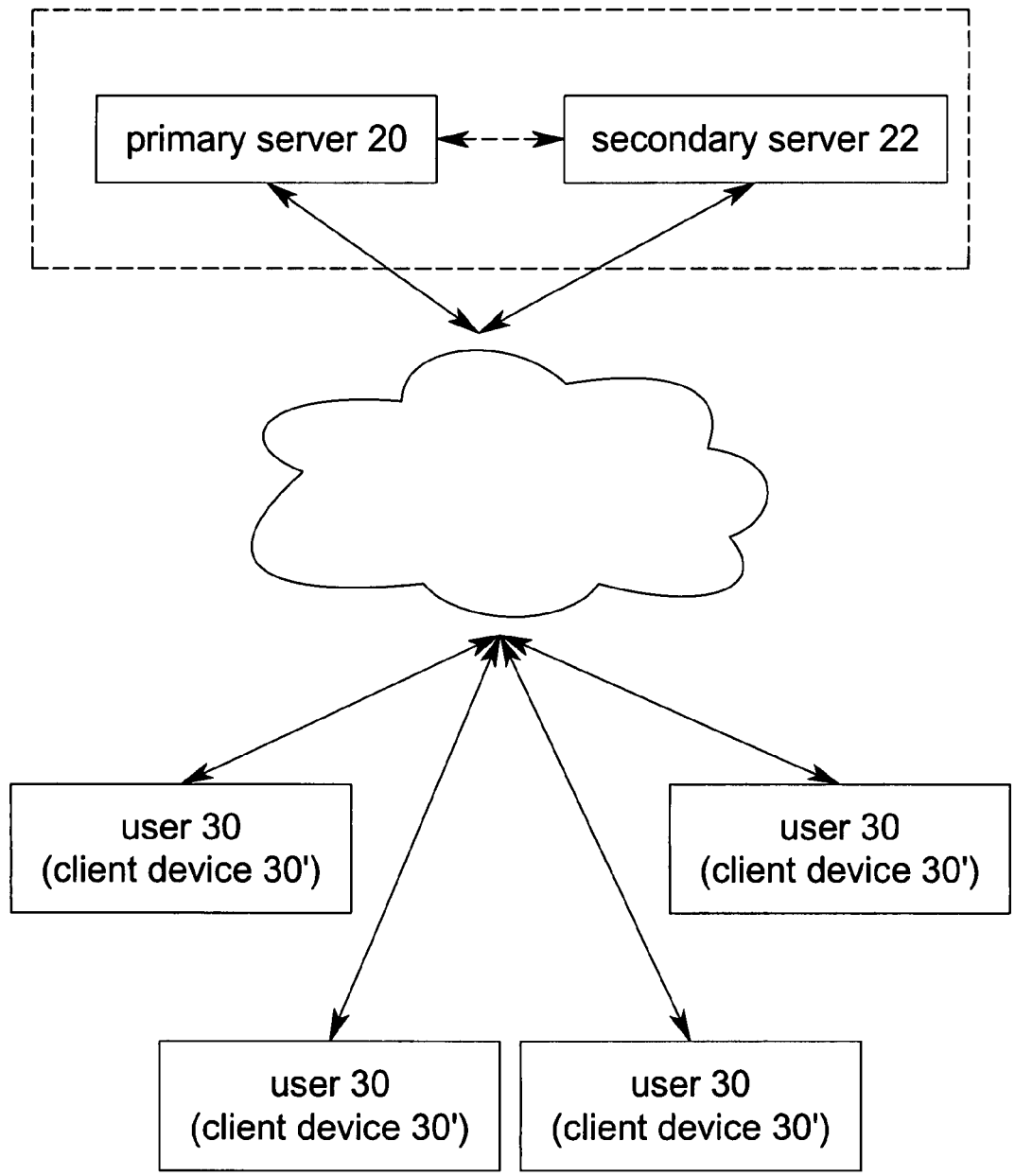
FIG. 1 is a block diagram of an exemplary network in which a primary server is linked to a secondary server and users interact with the servers circuitously.

As shown in FIG. 1, the present invention uses a primary server 20 (that can be a software application and/or a server) and at least one secondary server 22 (that can be a software application and/or a server). The primary server 20 could be, for example, a game server, a social network server, a collaboration server, "authentication only" provider, account database, and/or other types of applications and/or servers. The secondary server 22 could be, for example, a voice server, database/search provider, and/or other feature server that is desirable to add to the application in the primary server 20. It should be noted that there may be multiple secondary servers 22. In one preferred embodiment, the secondary server 22 is operated by the same entity that operates the primary server 20. In another preferred embodiment, the primary server 20 and the secondary server 22 are operated by separate entities. Whether or not the primary server 20 and secondary server 22 are operated by the same entity, they may be operated on the same network or on different networks, on the same computing system or different computing systems, and/or on the same processor or different processors.

In the example shown in FIG. 1, the primary server 20 and secondary server 22 are shown as linked, whereas the users 30 (with associated client devices 30') interact with the servers 20, 22, circuitously. It should be noted, however, that the primary server 20 and secondary server 22 may have any type of communicative relationship including being linked (e.g. hardwired or using a LAN or wireless LAN) or linked circuitously through an indirect network (e.g. the Internet or the World Wide Web). It should be noted that the servers 20, 22 and users 30 (via their respective client devices 30') may be linked (e.g. hardwired or using a LAN or wireless LAN) or linked circuitously (e.g. the Internet or the World Wide Web). For purposes of this application, "direct passing" may happen over a circuitous link as well as a direct link. Similarly, for purposes of this application, "indirect passing" may happen over a circuitous link as well as a direct link.

An efficient authentication method, apparatus, and/or system of the present invention allows users 30 to input data components such as a username 32 (FIGS. 2 and 4) and a password 34 (FIGS. 2 and 4) into a primary server 20 and, therethrough, to obtain access to at least one secondary server 22. The username 32 and password 34 may be any two variables (e.g. numbers, letters, and/or characters) or strings of variables associated with the user. For example, the username 32 could be selected by the user, could be assigned to the user, or could be a determinable variable (e.g. an e-mail address, a social security number, a phone number, a birth date, and coordinates). Similarly, the password 34 could be selected by the user, could be assigned to the user, or could be a determinable variable (e.g. an e-mail address, a social security number, a phone number, a birth date, and coordinates). It should be noted that the "username" and/or the "password" may be input using traditional means such as a keyboard, mouse, or touch screen. Alternatively the "username" and/or the "password" may be a security key provided by alternative means such as a card reader (e.g. an access card reader), a fingerprint reader, an iris reader, a radio frequency card, or other non-traditional means. It should be noted that non-traditional "usernames" and/or "passwords" may need to be translated into more traditional variables. Although in most systems both the username 32 and the password 34 are needed to access the primary server 20, it is a general assumption that the username 32 may be less secure than the password 34, although this is not necessary true. In the present invention, the password 34 is preferably not passed to the secondary server 22 whereas the username 32 is passed to the secondary server 22.

Figure 2:
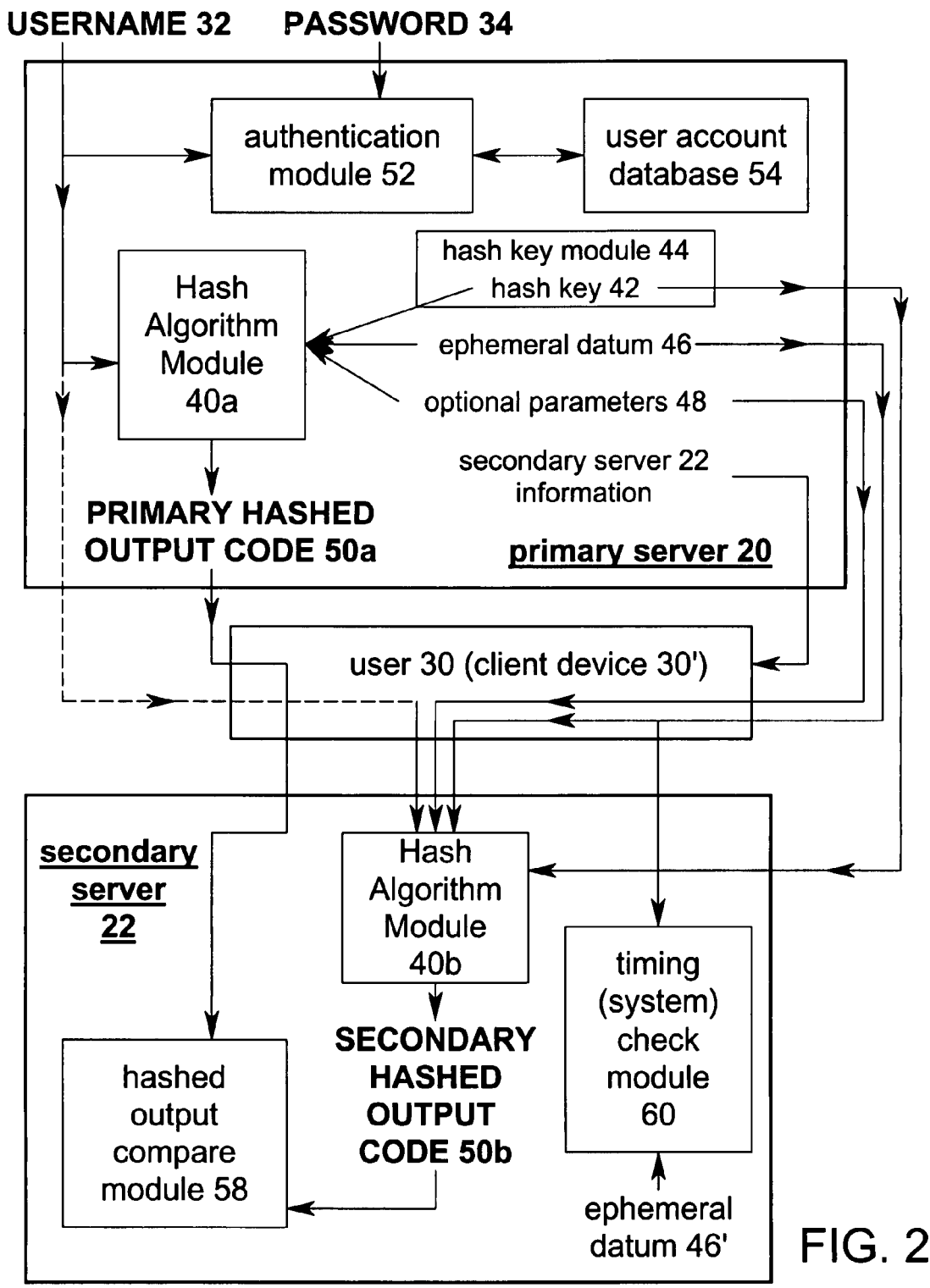
FIG. 2 is a block diagram of a first exemplary embodiment of the present invention using a primary server having a hash algorithm module and a secondary server having a hash algorithm module, the primary server directly passing the hash key to the secondary server, the primary server indirectly passing the hashed output code to the secondary server via the user.
Figure 4:
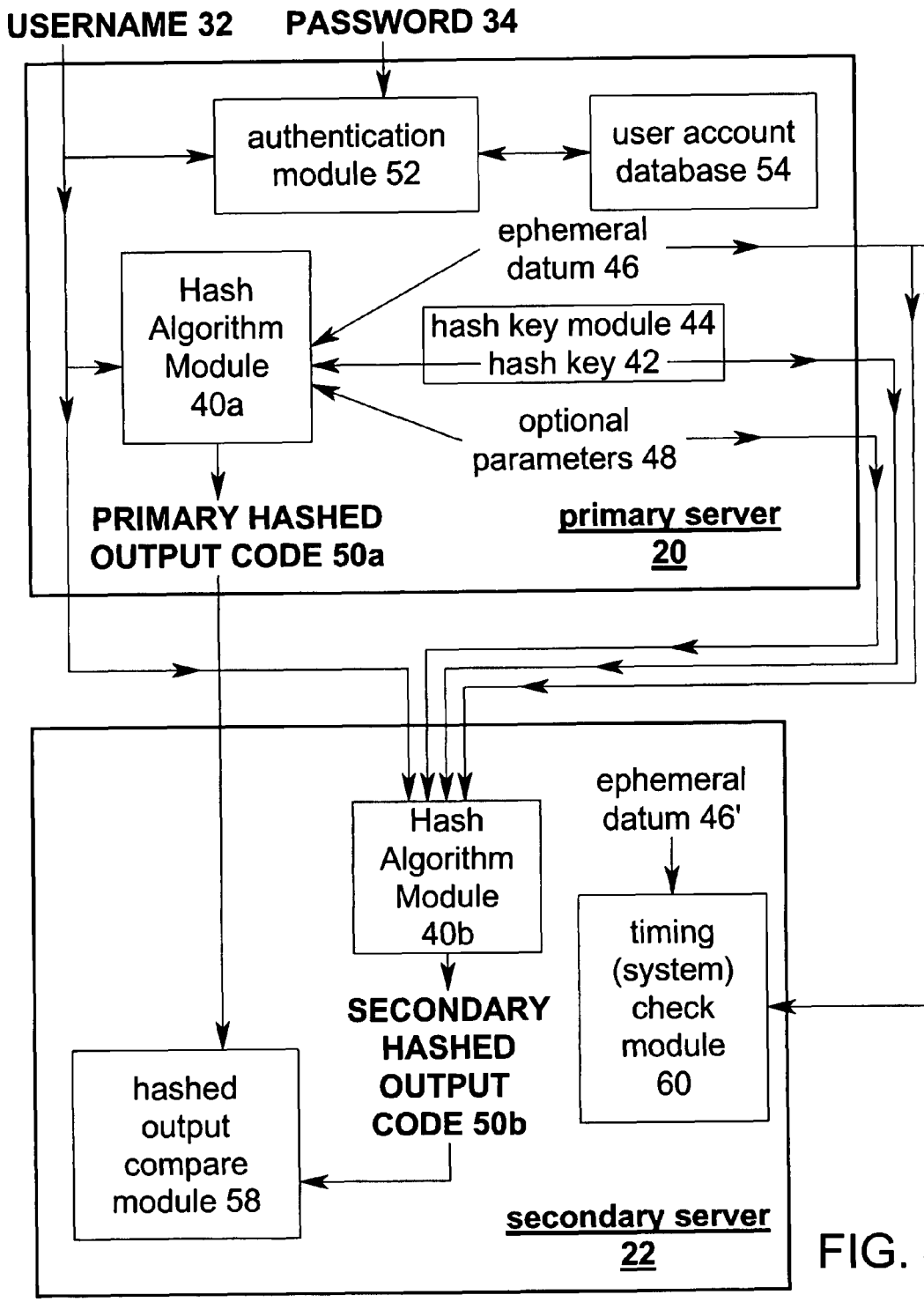
FIG. 4 is a block diagram of a second exemplary embodiment of the present invention using a primary server having a hash algorithm module and a secondary server having a hash algorithm module, the primary server directly passing the secondary server both the hash key and the hashed output code.

FIGS. 2 and 4 show first and second exemplary embodiments of the present invention using a primary server 20 having a primary hash algorithm module 40a (that produces primary hashed output code 50a) and a secondary server 22 having a secondary hash algorithm module 40b (that produces a secondary hashed output code 50b). Both embodiments use a hash key module 44 to generate a hash key 42 (a parameter to the algorithm). FIG. 2, FIG. 3A, and FIG. 3B detail a first exemplary embodiment of the present invention in which the primary server 20 directly passes the hash key 42 to the secondary server 22, but the primary server 20 indirectly passes the primary hashed output code 50a to the secondary server 22 via the client devices 30'. FIG. 4, FIG. 5A, and FIG. 5B detail a second exemplary embodiment of the present invention in which the primary server 20 directly passes the secondary server 22 both the hash key 42 and the primary hashed output code 50a. As mentioned, for purposes of this application, both "direct passing" and "indirect passing" may happen over a circuitous link as well as a direct link.

FIGS. 2 and 4 show exemplary embodiments of the present invention using a primary server 20 having a primary hash algorithm module 40a and a secondary server 22 having a secondary hash algorithm module 40b. The hash algorithm modules 40a, 40b are discussed generally as hash algorithm module 40 or as hash algorithm 40. The hash algorithm modules 40a, 40b are set to implement the same algorithm or function using data components such as the hash key 42, the username 32, ephemeral datum 46 (primary ephemeral datum), and optional parameters 48. For the present invention to function, both the hash algorithm modules 40a, 40b of the primary and secondary servers 20, 22 must use the same hash key 42. In one preferred embodiment of the present invention, the primary server 20 uses the hash key module 44 to generate the hash key 42 to be used in the hash algorithm 40. The primary server 20 sends this hash key 42 to the secondary server 22. The primary server 20 can periodically update this hash key 42, if desired, for increased security. The periodic updates can be, for example time based (e.g. every few seconds, every few minutes, or every few hours), random, or cycle based at predetermined times in a cycle (e.g. turning on the client device 30', whenever a user surfs between web sites, or at other cycle times). It should be noted that, in an alternative preferred embodiment, a secondary server 22 generates and sends the hash key 42 to the primary server 20. It should also be noted that, in yet another alternative preferred embodiment, an external source (e.g. an external hash key module 44) generates and sends the hash key 42 to both the primary and the secondary servers 20, 22. It should be noted that more than one hash key 42 may be used, for example, if there is more than one secondary server 22, the hash key module 44 may generate a separate hash key 42 for each secondary server 22 (e.g. to control which secondary servers 22, if any, a client device 30' of a user 30 would be able to access). It should be noted that "generation" of the hash key 42 may be accomplished using other methods besides true "generation" including, but not limited to calculation, random selection, selection from a list, creation, obtaining from alternative sources (e.g. an external computer or the administrator of the primary server 20), and other methods by which a parameter could be obtained or derived.

FIGS. 2 and 4 also show that the primary server 20 may use additional data components such as ephemeral datum 46 and optional parameters 48 in its primary hash algorithm module 40a. The primary server 20 passes the ephemeral datum 46 and optional parameters 48 to the secondary server 22 for use in the secondary hash algorithm module 40b. FIG. 2 shows the primary server 20 indirectly passing the ephemeral datum 46 and optional parameters 48 to the secondary server 22 via the client device 30' of the user 30. FIG. 4 shows the primary server 20 directly passing the ephemeral datum 46 and optional parameters 48 to the secondary server 22. The secondary server 22 may also have its own ephemeral datum 46' (secondary ephemeral datum).

FIGS. 2 and 4 also show additional modular components that might be found in communicative relationship with the servers 20, 22. For example, the authentication module 52 and the user account database 54 are modular components that may be used for an initial authentication of a client device 30' and/or user 30 to the primary server 20 based on the username 32 and the password 34. In the shown embodiment, the authentication module 52 and the user account database 54 are located in the primary server 20, although they may be separate modular components (distinct from the servers 20, 22), combined modular components, or modular components of another system. (The term "modular" is meant only to designate that function may be thought of as a module, not that it must be implemented as a module.) Another modular component shown in FIG. 2 is a hashed output compare module 58 that compares primary hashed output code 50a (from the primary hash algorithm module 40a) with secondary hashed output code 50b (from the secondary hash algorithm module 40b). In the shown embodiment, the hashed output compare module 58 is located in the secondary server 22, although it may be a separate modular component, a combined modular component, or a modular component of another system. Yet another modular component shown in FIG. 2 is a system check shown as timing check module 60. In the shown embodiment, the timing check module 60 is located in the secondary server 22, although it may be a separate modular component, a combined modular component, or a modular component of another system.

FIGS. 3A and 3B show a simplified exemplary example of a first embodiment of a method by which the present invention may be implemented. FIGS. 5A and 5B show a simplified example of a second embodiment of a method by which the present invention may be implemented.

FIG. 3A and FIG. 3B show a simplified example of a first embodiment of a method by which the present invention may be implemented. This first embodiment can be visualized as a "movie ticket" embodiment in which the user "buys" (authenticates) a ticket (the primary hashed output code) from a ticket seller (primary server), the ticket seller hands the ticket (the primary hashed output code) to the user, and the user hands the ticket (the primary hashed output code) to the ticket taker at the theater (secondary server). As shown, the first step 70 is receiving a username, a password, and a hash key at the primary server. It should be noted that the username 32 and password 34 are preferably provided (and received) via a separate path and/or are preferably provided (and received) at a different time than the hash key 42. It should be noted that ephemeral datum 46 and optional parameters 48 may also be provided (and received) at this step. Another step 72 is receiving the username and the hash key at the secondary server. It should be noted that the username 32 is preferably provided (and received) via a separate path and/or is preferably provided (and received) at a different time than the hash key 42. In this embodiment the username 32 may be provided to the secondary server 22 by the primary server 20 (shown in phantom) or by the client device 30' of the user 30. It should be noted that ephemeral datum 46 and optional parameters 48 may also be provided (and received) at this step. It should be noted that step 70 may not be "complete" before step 72 begins. For example, the order may be that first the hash key 42 may be provided (and received) at substantially the same time (both step 70 and step 72), that second the second username 32 and password 34 are provided (and received) at the primary server 22 (step 70), and that third the username 32 is provided (and received) at the secondary server 22 (step 72). It should be noted that step 74 shows an ongoing generation and provision of the hash key periodically throughout this method so that the hash key 42 may be periodically updated in step 70, step 72, and at other times during the method. Then, at step 76, the user is initially authenticated to the primary server based on the username and the password. This initial authentication may be accomplished by known authentication methods such as the "basic authentication method" and the "hash authentication method." At step 78, a primary hash algorithm is performed on the username and the hash key to produce a primary hashed output code. As shown in FIG. 2, the primary hashed output code 50a may be provided by the primary server 20 to the client device 30' of the user 30 that, in turn, provides the primary hashed output code 50a to the secondary server 22. At step 80 a secondary hash algorithm is performed on the username and the hash key to produce a secondary hashed output code. Once the primary hash algorithm and the secondary hash algorithm have been performed, at step 82 the primary hashed output code and the secondary hashed output code are compared. Optionally, at step 84 a system check may be performed for added security. Finally, at step 86, the client device 30' and/or the user 30 is authenticated to the secondary server if the primary hashed output code and the secondary hashed output code match (or are within predetermined tolerances).

FIG. 5A and FIG. 5B show a simplified example of a second embodiment of a method by which the present invention may be implemented. As shown, the first step 90 is receiving a username, a password, and a hash key at the primary server. It should be noted that the username 32 and password 34 are preferably provided (and received) via a separate path and/or are preferably provided (and received) at a different time than the hash key 42. It should be noted that ephemeral datum 46 and optional parameters 48 may also be provided (and received) at this step. Another step 91 is receiving the username and the hash key at the secondary server. It should be noted that the username 32 is preferably provided (and received) via a separate path and/or is preferably provided (and received) at a different time than the hash key 42. This embodiment is shown as having the username 32 provided directly to the secondary server 22 by the primary server 20. It should be noted that ephemeral datum 46 and optional parameters 48 may also be provided (and received) at this step. It should be noted that step 90 may not be "complete" before step 91 begins. For example, the order may be that first the hash key 42 may be provided (and received) at substantially the same time (both step 90 and step 91), that second the username 32 and password 34 are provided (and received) at the primary server 22 (step 90), and that third the username 32 is provided (and received) at the secondary server 22 (step 91). It should be noted that step 92 shows an ongoing generation and provision of the hash key periodically throughout this method so that the hash key 42 may be periodically updated in step 90, step 91, and at other times during the method. Then, at step 93, the user is initially authenticated to the primary server based on the username and the password. This initial authentication may be accomplished by known authentication methods such as the "basic authentication method" and the "hash authentication method." At step 94, a primary hash algorithm is performed on the username and the hash key to produce a primary hashed output code. As shown in FIG. 4, the primary hashed output code 50a may be provided by the primary server 20 directly to the secondary server 22. At step 95 a secondary hash algorithm is performed on the username and the hash key to produce a secondary hashed output code. Once the primary hash algorithm and the secondary hash algorithm have been performed, at step 96 the primary hashed output code and the secondary hashed output code are compared. Optionally, at step 97 a system check may be performed for added security. Finally, at step 98, the client device 30' and/or the user 30 is authenticated to the secondary server if the primary hashed output code and the secondary hashed output code match (or are within predetermined tolerances).

It should be noted, however, that some of the features shown and discussed in one preferred embodiment may be implemented in another preferred embodiment. For example, the username 32 may be passed directly to the secondary server 22 by the client device 30' or indirectly to the secondary server 22 via the primary server 20. It should also be noted that alternative preferred embodiments may combine elements of other preferred embodiments. For example, the primary hashed output code 50a may be passed directly from the primary server 20 to the secondary server 22 while the ephemeral datum 46 is passed indirectly from the primary server 20 to the secondary server 22 via the client device 30' of the user 30. It should also be noted that some of the steps in the methods described above may be performed in alternative orders. For example, the username and the hash key may not be sent until just before the step of performing a secondary hash algorithm. The following paragraphs provide additional detail about the steps shown in FIGS. 3A, 3B, 5A, and 5B as well as additional steps and variations of the steps.

As discussed, the authentication method of the present invention provides secure access to a user 30 who provides a username 32 and a password 34 to the system to a primary server 20. Each time the user 30 logs in, he first logs into the primary server 20 using conventional authentication methods (e.g. the "basic authentication method" or the "hash authentication method"). In the shown embodiment, the primary server 20 has an initial authentication module 52 that receives the username 32 and password 34. The authentication module 52 compares the username 32 and password 34 with those stored in the user account database 54. The primary server 20 permits the login if there is a match (which may not be an exact match, but may be a match within predetermined tolerances) to the password 34 stored in the user account database 54 for the associated username 32. It should be noted that the user 30 may be logging into a primary server 20 over the Internet, via a LAN, or on his own client device 30'. It should be noted that exemplary client devices include computers, workstations, handheld technical devices (e.g. Pocket PC® devices, Palm® devices), interactive televisions, kiosks, dedicated devices, or virtually any current or future interactive technologies.

Figure 6:
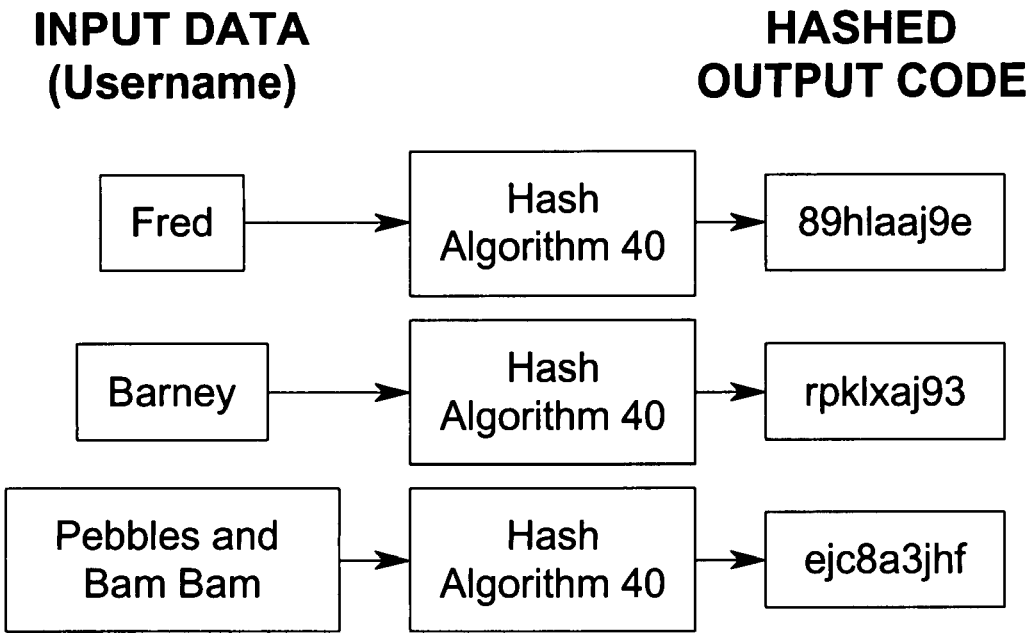
FIG. 6 is a block diagram illustrating input data being passed through a hash algorithm module to produce hashed output code.

Next, the primary hash algorithm module 40a of the primary server 20 uses a hash (or message digest) algorithm such as SHA1, MD5, RIPEMD-160, HAVAL, Whirlpool or any other algorithm for which it is not feasible to find the input necessary to generate a particular hash output code (called "a preimage attack" in the art) to produce a primary hashed output code 50a from the username 32, the hash key 42, and preferably some ephemeral datum 46 (e.g. time, physical location, and/or virtual location). FIG. 6 shows usernames 32 being used as input data to the hash algorithm 40 that changes (e.g. substitutes, transposes, calculates, and/or generates) and outputs hashed output code. As shown in FIGS. 2 and 4, in addition to the hash key 42 and the ephemeral datum 46, alternative preferred embodiments of the present invention may use other parameters for the hash algorithm 40. For example, optional parameters 48 that may be included in the hash algorithm 40 include, but are not limited to, quality levels and enabling flags (e.g. for features that are either optional or require a premium or paid account level). It should be noted that the optional parameters 48 may be the primary server-specified parameters and/or flags or the optional parameters 48 may be user-specified parameters and/or flags.

Figure 7:
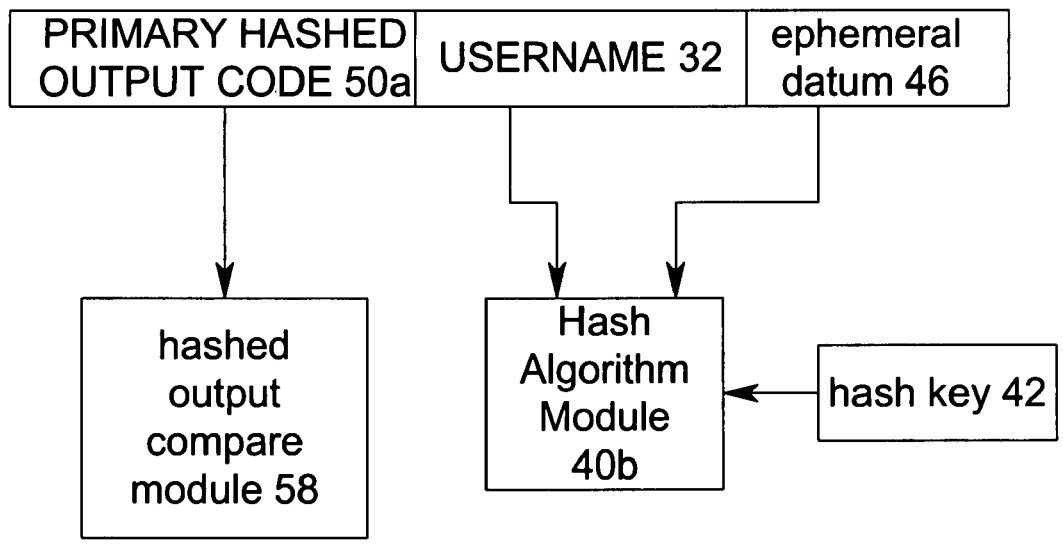
FIG. 7 is a block diagram showing the primary hashed output code concatenated with the username and the ephemeral datum for transmission from the primary server and then divided so that data components go to the correct module in the secondary server.

As mentioned, the secondary server 22 receives several data components directly or indirectly (via the user's client device 30') from the primary server 20, including the hash key 42, the username 32, and the primary hashed output code 50a. The secondary server 22 may also receive additional data components directly or indirectly (via the user's client device 30') from the primary server 20 such as ephemeral datum 46 and optional parameters 48. Preferably, at least the hash key 42 is provided separately from the remainder of the data components as it is periodically updated. Although the remaining data is shown as being provided separately over separate paths, the data may be concatenated, appended, merged, or otherwise combined such that it is sent as a single transmission directly or indirectly from the primary server 20. FIG. 7 shows the primary hashed output code 50a concatenated (arranged into a chained list) with the username 32 and the ephemeral datum 46 for transmission from the primary module 20 and then divided (parsed) so that data components go to the correct module in the secondary server 22.

The login process for logging into the secondary server 22 uses the primary hashed output code 50a, the hash key 42, and his username 32 and, in some embodiments, uses the ephemeral datum 46 and optional parameters 48. The secondary hash algorithm module 40b of the secondary server 22 uses the same hash (or message digest) algorithm as that used in the primary hash algorithm module 40a to produce a secondary hashed output code 50b from the received data. The hashed output compare module 58 compares the primary hashed output code 50a to the secondary hashed output code 50b. If the primary hashed output code 50a and the secondary hashed output code 50b match (or are within a predetermined tolerance), the user is "authenticated" or logged into the secondary server 22 so that he is provided access to the secondary server 22 or provided services from the secondary server 22. Although ideally a primary hashed output code 50a and the secondary hashed output code 50b "match" exactly, an alternative preferred embodiment allows the hashed output codes 50a, 50b to match "within a predetermined tolerance." This allows the system to take into consideration the possibility that some digits may be dropped intentionally and/or accidentally.

As mentioned, an optional step may be a system check performed for added security. The system check may be a timing check that is performed using a timing check module 60 (FIG. 2). Using a timing check, the secondary server 22 can optionally allow a short window of time in which the primary hashed output code 50a is valid. This could be accomplished by comparing the ephemeral datum 46 from the primary server 20 with ephemeral datum 46' generated in the secondary server 22. For example, the timing check may allow only twenty (20) seconds between the time that the primary hashed output code 50a is sent (directly or indirectly) by the primary server 20 and the time that the primary hashed output code 50a is received by the secondary server 22. The timing check may monitor other occurrences in the process. For example, the timing check may only allow one minute between the time that the authentication module 52 authenticates the client device 30' and/or the user 30 to the primary server 20 and the time the hashed output compare module 58 finds a match between the primary hashed output code 50a and the secondary hashed output code 50b.

Figure 8:
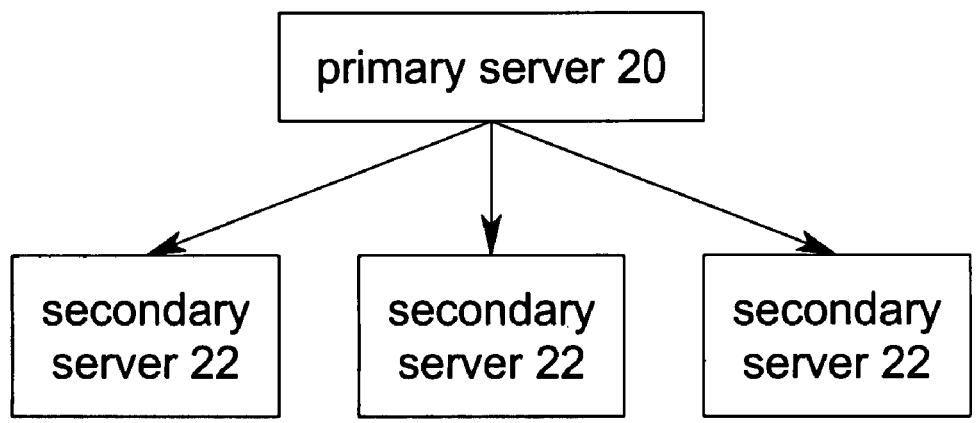
FIG. 8 is a block diagram of an exemplary network in which a primary server is linked to a plurality of secondary servers.
Figure 9:
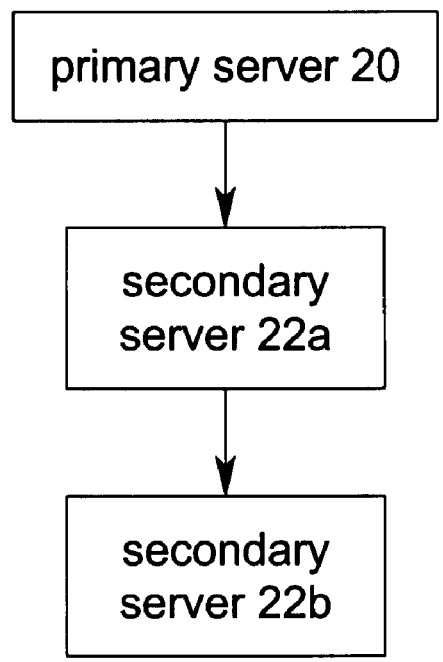
FIG. 9 is a block diagram of an exemplary network in which a primary server is linked to a first secondary server and the first secondary server is linked to a second secondary server.

The present invention may also be implemented in with multiple secondary servers 22. For example, FIG. 8 shows an exemplary network in which a primary server 20 is linked (directly or indirectly) to a plurality of secondary servers 22. FIG. 9 shows an exemplary serially arranged network in which the primary server 20 is linked to a first secondary server 22a and the first secondary server 22a is linked to a second secondary server 22b. In this embodiment, the first secondary server 22a may act both as a primary server and as a secondary server (e.g. it may generate its own hash key 42 to send to the second secondary server 22b). As mentioned, a single hash key 42 may be sent to all the secondary servers 22, 22a, 22b or a unique hash key 42 may be generated for each secondary server 22, 22a, 22b. The arrangements shown in FIG. 8 and FIG. 9 may also be combined such that some of the secondary servers shown in FIG. 8 have additional secondary servers serially arranged thereafter such as those shown in FIG. 9.

Another potential embodiment is to use an "authentication only" server to provide access to an arbitrary number of additional servers that provide the actual features. A dedicated authentication server can also be used to provide authentication services for servers for which it is inappropriate or unfeasible for it to maintain a user account database 54. Besides allowing for the addition of third party services to a primary service, it could also allow the authentication itself to be contracted to a third party specializing in authentication and account maintenance.

This efficient authentication method is secure because the hashed output code 50a, 50b is specific to the client device 30' and/or the user 30 (the username 32), the hash key 42, ephemeral datum 46 (e.g. time, physical location, and/or virtual location), and the optional parameters 48 (e.g. the optional flags for features and privileges). Further, this method is secure because the user's password 34 is never sent between servers 20, 22. Further, this method is secure because the secondary server 22 can optionally allow a short window of time (timing check) in which the hashed output code 50a is still valid. Further, this method is secure because the secondary server 22 can permit or deny access to certain features based on authenticated data controlled by the primary server 20 using optional parameters 48.

FIGS. 10-14 show exemplary simplified screens/windows for preferred implementations of the present invention. These examples use an application/client software which may run in the user's client device 30', on the primary server 20, on the secondary server 22, or on a unique dedicated server. The application/client software may be dedicated to the purposes of this invention, or may be a component of another application/client software. Although the examples below discuss the user providing the username and password, these may be provided by the primary server during an earlier login process. These examples are not meant to limit the scope of the invention.

FIG. 10 shows an initial screen/window for a first preferred implementation of the present invention. In this implementation, the application/client software automatically logs into both the primary server 20 and the secondary server 22 for the user 30. The process is virtually seamless to the user 30. The user 30 provides his username 32, password 34, and/or any additional information required by the application/client software. The user 30 then authorizes the authentication and/or login by activating the authentication process (e.g. by clicking on the "authenticate" button). This causes the application/client software and/or the primary server 20 to use a hash algorithm 40 to produce a hashed output code 50a from the username 32, the hash key 42 (which has been previously sent to the secondary server 22), and preferably some ephemeral datum 46. The hashed output code 50a (and other data such as the username 32) is sent to the secondary server 22 and the user 30 is automatically logged into the secondary server 22.

FIG. 11 shows an initial screen/window for a second preferred implementation of the present invention when it is used in combination with the screen/window of FIG. 12. In this implementation, the application/client software automatically logs into the primary server 20 for the user 30. The user 30 is then directed to the secondary screen/window of FIG. 12 which presents the user 30 with the option of logging into the secondary server 22. One possible scenario is that by the user 30 selecting the option, the application/client software and/or the primary server 20 automatically use a hash algorithm 40a to produce a hashed output code 50a from the username 32, the hash key 42 (which has been previously sent to the secondary server 22), and preferably some ephemeral datum 46. The hashed output code 50a (and other data such as the username 32) is sent to the secondary server 22 and the user 30 is automatically logged into the secondary server 22. Another possible scenario is that by the user 30 selecting the option, the application/client software and/or the primary server 20 sends the hashed output code 50a (which has been previously produced by a hash algorithm 40a from the username 32, the hash key 42, and preferably some ephemeral datum 46) and other optional data (such as the username 32) to the secondary server 22 and the user 30 is automatically logged into the secondary server 22.

FIG. 11 also shows an initial screen/window for a third preferred implementation of the present invention when it is used in combination with the screen/window of FIG. 13. In this implementation, the application/client software automatically logs into the primary server 20 for the user 30. The user 30 is then directed to the secondary screen/window of FIG. 13 which presents the user 30 with the option of manually logging into the secondary server 22. In this option the user 30 manually enters the hashed output code 50a. Either when the user 30 logs into the primary server 20 and/or when the user 30 logs into the secondary server 22, the application/client software and/or the primary server 20 uses a hash algorithm 40a to produce a hashed output code 50a from the username 32, the hash key 42 (which has been previously sent to the secondary server 22), and preferably some ephemeral datum 46. The hashed output code 50a may be provided to the user 30 and/or the client device 30' using any communication over a TCP/IP connection, a pop-up window, an e-mail, or any known manner of providing or transmitting information.

FIG. 14 shows an initial screen/window for a fourth preferred implementation of the present invention. In this implementation, the application/client software automatically logs into the primary server 20 for the user 30 and, if the user 30 selects the option, the application/client software will automatically log into the secondary server 22 and/or additional servers 22. Outside of the selection of the additional servers 22, the process is virtually seamless to the user 30. The user 30 provides his username 32, password 34, and/or any additional information required by the application/client software. The user 30 then authorizes the authentication and/or login. This causes the application/client software and/or the primary server 20 to use a hash algorithm 40a to produce a hashed output code 50a from the username 32, the hash key 42 (which has been previously sent to the secondary server 22), and preferably some ephemeral datum 46. The hashed output code 50a (and other data such as the username 32) is sent to the secondary server 22 (and, if selected, the additional servers 22) and the user 30 is automatically logged into the secondary server 22 (and, if selected, the additional servers 22).

The present invention does not have to be implemented at login and can be implemented at any time while the client device 30' and/or the user 30 is logged into both servers 20, 22. For example, during game play, a primary server can directly or indirectly send authenticated virtual positions to the secondary server. In this preferred embodiment, instead of a username 32 (or in addition to the username 32), the coordinates are passed as input data and authenticated (hashed by the hash algorithms 40a, 40b and compared by the compare module 58). For example, at any time while the client device 30' and/or the user 30 is logged into both servers 20, 22, features or parameter values can be denied or constrained by the primary server 20. For example, in a 3D voice environment, it is may not be desirable to allow a user 30 to set his coordinates to any point in a virtual world. Further, it may not be desirable to have the primary server 20 send all coordinate changes to the secondary server 22, since this is a duplication of the coordinate changes that the primary server 20 has to send to each user 30 (client device 30'). In this method, the primary server 20 can send a hashed output code 50a along with coordinate (or any other parameter) changes directly or indirectly to the secondary server 22. For example, in one embodiment the primary server 22 generates the coordinates, but if the server-server connection for coordinate changes is not feasible, the primary server 22 can send a hashed version of the coordinates to the user 30 (client device 30') and the user 30 (client device 30') would forward the hashed version of the coordinates to the secondary server 22. The hash of the coordinates prevents a user 30 from "cheating" by substituting his own coordinates. Optionally the secondary server 22 could allow for a range of coordinates (or values of other parameters) that will be accepted, so long as the current value is within X units (e.g. radius) of the authenticated coordinate value. This is another type of system check that could be implemented by check module 60 for example, if the coordinates are passed as ephemeral datum 46. Allowing a range or tolerance in the authenticated coordinate values would be advantageous if the client device 30' is "interpolating," and sending coordinates at a much higher rate so that the motion is smooth. Limiting the range or tolerance of the radius, however, prevents a client device 30' that has been hacked by the user 30 from setting audio coordinates a mile away from the location specified by the primary server 20 with the intention of listening to someone else's conversation. This system check could be used to allow the primary server 20 to authenticate coordinate or other parameter updates less often (for example, once per second or every five seconds) because there is an allowed tolerance in the coordinates or other parameter updates.

The descriptions and applications herein are not to be construed as limiting the invention, but as examples and illustrations of the invention. It should be noted that the present invention may be implemented using operating systems including but not limited to Windows Vistas, Windows 95®, Windows 98®, Windows CE®, Windows Me®, Windows NT®, Windows2000®, Linux®, MacOS®, BeOS®, or virtually any current or future operating system. It should be noted that the present invention may be implemented using different types of technology including but not limited to computers, workstations, handheld technical devices (e.g. Pocket PC® devices, Palm® devices), interactive televisions, kiosks, dedicated devices, or virtually any current or future interactive technologies. It should be noted that a method of the present invention may be encoded on a computer (or other technology) readable medium.

It should be noted that relative terms (e.g. primary and secondary) are meant to help in the understanding of the technology and are not meant to limit the scope of the invention. It should be further noted that although the present invention is described in terms of modules (modular components) and data components, the terms are not meant to be limiting. For example, the hash key module 44 might include multiple processors and/or memory elements. Alternatively, the hash key module 44 might be combined with another modular component (e.g. the hash algorithm module 40a) such that a single modular component performs the function of the two "modules." The terms "provide" and "providing" are meant to include standard means of provision including "transmit" and "transmitting," but can also be used for non-traditional provisions as long as the data is "received" (which can also mean obtained).

Exemplary Code:

The following sections of code show one preferred implementation of the present invention. It should be noted, however, that the code is meant to be exemplary and not to limit the scope of the invention.

Hashlogin.h

```
/****************************************************************
File:          hashlogin.h
Purpose:       Hashed authentication system demonstration
****************************************************************/
#ifndef hashlogin_HEADER
#define hashlogin_HEADER
class PrimaryServer;
class SecondaryServer;
class Client;
class Client
{
public:
   Client(void);
   ~Client(void);
   // Simulate sending a message from primary server to user (client)
   // giving the credentials (ephemeral datum, optional parameters,
   // and primary hashed output code (in this case
   // the client already knows its own username) for a login
   void SetCredentials(SecondaryServer *server, _int64 timestamp,
char * params, unsigned char hash[ ]);
   // Tell the user (client) to login to a primary server
   void LoginToPrimaryServer(PrimaryServer * server);
};
class SecondaryServer
{
public:
   SecondaryServer(void);
   ~SecondaryServer(void);
   enum
   {
      KEY_MAXLEN = 128,
   };
public:
   // Simulate logging in to the secondary server using the
   // hashed method of the present invention
   bool HashLogin(Client *client, _int64 timestamp, char * username,
                  char * params, unsigned char hash[ ]);
   // Simulates sending the hash (secret) key
   // on a secondary server
   void SetSecretKey(char * key);
private:
   Client *mClient;
   char mKey[KEY_MAXLEN];
public:
};
class PrimaryServer
{
public:
   PrimaryServer(void);
   ~PrimaryServer(void);
   // Simulates a user (client) logging in to the primary server
   bool Login(char * username, char * password, Client * client);
   // Tell the primary server about the secondary server
   void SetSecondaryServer(SecondaryServer * server);
private:
   Client * mClient;
   SecondaryServer *mSecServer;
public:
};
#endif // ticket_HEADER
```

Primary Server

```
/****************************************************************
File:          PrimaryServer.cpp
Purpose:       Implements primary server simulation
****************************************************************/
#include <stdio.h>
#include <string.h>
#include <time.h>
#include "hashlogin.h"
#include "ticket.h"
// Hash (secret) key shared between primary and secondary servers
char * secret_key = "secretkey";
PrimaryServer::PrimaryServer(void)
{
}
```

Primary Server

```
PrimaryServer::~PrimaryServer(void)
{
}
// Simulates a user (client) logging in to the primary server
bool PrimaryServer::Login(char * username, char * password, Client * client)
{
    bool rv = false;
    if (strcmp(username, "Client") == 0 && strcmp(password, "PrimaryPassword") == 0)
    {
        printf("Client %s successfully logged into primary server.\n", username);
        // Successful login to primary server
        mClient = client;
        // Timestamp for login
        time_t timestamp = time(NULL);
        // Parameters describing quality and allowed optional features
        char *params = "stereo canlisten canspeak codec=siren14";
        // Storage for the hash login value (Primary hashed output code)
        unsigned char hash_ticket[ticket_LENGTH];
        // Create the authentication hash
        // Call the "Hash Algorithm Module 40a"
        ticket_CreateLogin(timestamp, username, params, hash_ticket, secret_key);
        // Give the secondary server credentials to the user (client)
        mClient->SetCredentials(mSecServer, timestamp, params, hash_ticket);
        rv = true;
    }
    return rv;
}
// Tell the primary server about the secondary server
void PrimaryServer::SetSecondaryServer(SecondaryServer * server)
{
    mSecServer = server;
    // Set the shared hash (secret) key for the secondary server
    mSecServer->SetSecretKey(secret_key);
    printf("Primary server set the secret key for the secondary server\n");
}
```

Secondary Server

```
/*********************************************************
File:        SecondaryServer.cpp
Purpose:     Implements Secondary Server Simulation
*********************************************************/
#include <stdio.h>
#include <time.h>
#include <string.h>
#include "hashlogin.h"
#include "ticket.h"
SecondaryServer::SecondaryServer(void)
{
}
SecondaryServer::~SecondaryServer(void)
{
}
// Simulate logging in to the secondary server using the
// hashed method of the present invention
bool SecondaryServer::HashLogin(Client *client, _int64 timestamp,
char * username, char * params, unsigned char hash[ ])
{
    bool rv = false;
    _int64 curtime = time(NULL);
    // Allow 10 seconds for hash to be valid (timing check)
    if (curtime - timestamp < 10)
    {
        unsigned char hash_ticket[ticket_LENGTH];
        // Call the "Hash Algorithm Module 40b"
        ticket_CreateLogin(timestamp, username, params, hash_ticket,
        mKey); if (memcmp(hash, hash_ticket, sizeof(hash_ticket)) == 0)
        {
            // The hashes match; user authenticated
            mClient = client;
            printf("User %s successfully authenticated on secondary server\n", username);
```

Secondary Server

```
            rv = true;
        }
    }
    if (!rv)
    {
        printf("User failed to log in to secondary server\n");
    }
    return rv;
}
// Simulates setting the hash (secret) key on a secondary server
void SecondaryServer::SetSecretKey(char * key)
{
    strncpy(mKey, key, KEY_MAXLEN-1);
    mKey[KEY_MAXLEN-1] = '\0';
}
```

Ticket.h

```
/*********************************************************
File:        ticket.h
Purpose:     Create and validate login tickets
*********************************************************/
#ifndef ticket_HEADER
#define ticket_HEADER
#include "sha1.h"
    #ifdef _cplusplus
    extern "C" {
    #endif
#define ticket_LENGTH sha1_HASHSIZE
/*--------------------------------------------------------
```

Ticket.h

```
Create a ticket to be used for logging in
timestamp    - A Unix time_t widened to 64 bits
username     - UTF8 user name as null terminated string
params       - A string containing optional parameters
ticket       - Pointer to a ticket (will be filled in by this function)
key          - The MAC key (a NULL terminated string)
--------------------------------------------------------------*/
void ticket_CreateLogin(int64_t timestamp, const char *username,
                        const char *params,
                        unsigned char ticket[ticket_LENGTH],
                        const char *key);
#ifdef _cplusplus
}
#endif
#endif // ticket_HEADER
```

Ticket.c

```
/******************************************************************
File:      ticket.c
Purpose:   Create and validate login tickets. Uses HMAC as described in RFC2104
******************************************************************/
/*================================================================
                              INCLUDES
================================================================*/
#include <stdlib.h>
#include <string.h>
#include "ticket.h"
/*================================================================
                              DEFINES
================================================================*/
#define HMAC_PADLEN 64
#define HMAC_IPAD 0x36
#define HMAC_OPAD 0x5C
#define BUFFER_SIZE 2048
/*================================================================
                               DATA
================================================================*/
/*================================================================
                               CODE
================================================================*/
*/----------------------------------------------------------------
    Compute sha1-based HMAC on a message
----------------------------------------------------------------*/
static void hmacsha1(unsigned char *msg, int msglen,
const unsigned char *key, int keylen, unsigned char *digest)
{
  sha1_HANDLE sha1han;
  unsigned char k_ipad[HMAC_PADLEN + 1]; // Inner padding – key XORd with ipad
  unsigned char k_opad[HMAC_PADLEN + 1]; // Outer padding – key XORd with opad
  unsigned char tk[Sha1_HASHSIZE];
  int i;
  sha1han = sha1_Create( );
  // If a key is longer than 64 bytes reset it to key = SHA1(key)
  if (keylen > 64)
  {
    sha1_Reset(sha1han);
    sha1_Input(sha1han, key, keylen);
    sha1 Result(sha1han, tk);
    key = tk;
    keylen = sha1_HASHSIZE;
  }
  // Store the key in the pads
  memset(k_ipad, 0, sizeof(k_ipad));
  memset(k_opad, 0, sizeof(k_opad));
  memcpy(k_ipad, key, keylen);
  memcpy(k_opad, key, keylen);
  // XOR key with ipad and opad value
  for (i = 0; i < HMAC_PADLEN; i++)
  {
    k_ipad[i] ^= HMAC_IPAD
    k_opad[i] ^= HMAC_OPAD
  }
  // Perform inner SHA1
  sha1_Reset(sha1han);
  sha1_Input(sha1han, k_ipad, HMAC_PADLEN);
  sha1_Input(sha1han, msg, msglen);
  sha1_Result(sha1han, digest);
  // Perform outer SHA1
  sha1_Reset(sha1han);
  sha1_Input(sha1han, k_opad, HMAC_PADLEN);
```

-continued

Ticket.c

```
    sha1_Input(sha1han, digest, sha1_HASHSIZE);
    // Finish up the second pass
    sha1_Result(sha1han, digest);
}
*/--------------------------------------------------------------------------
    Concatenate a zero terminated text string onto a buffer and return the new
position at the end of the buffer.
--------------------------------------------------------------------------*/
static char * ConcatBuffer(char *start, char *end, const char *source)
{
    int len = strlen(source) + 1;
    if (start + len < end)?
    {
        memcpy(start, source, len);
    }
    return start + len;
}
// This function implements both modules 40a and 40b using the
// algorithm HMAC-SHA-1
*/--------------------------------------------------------------------------
    Create a ticket to be used for logging in
--------------------------------------------------------------------------*/
void ticket_CreateLogin(int64_t timestamp, const char *username, const
char *params,
                        unsigned char ticket[ticket_LENGTH],
                        const char *key)
{
    char sourcebuf[BUFFER_SIZE];
    char *pos = sourcebuf;
    char *end = sourcebuf + BUFFER_SIZE;
    memset(sourcebuf, 0, sizeof(sourcebuf));
    memcpy(pos, &timestamp, sizeof(timestamp));
    pos += sizeof(timestamp);
    pos = ConcatBuffer(pos, end, username);
    pos = ConcatBuffer(pos, end, params);
    hmacsha1(sourcebuf, BUFFER_SIZE, key, strlen(key), (unsigned char *)ticket);
}
```

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. An efficient authentication method for providing a user access to a primary server and at least one secondary server, said primary server and said at least one secondary server being in a communicative relationship, said method comprising:
    (a) entering a username into a client device;
    (b) providing said username and a hash key to at least one secondary server;
    (c) authenticating said user to said primary server based on said username and a password;
    (d) performing a primary hash algorithm on said username and said hash key to produce a primary hashed output code;
    (e) performing a secondary hash algorithm on said username and said hash key to produce a secondary hashed output code;
    (f) providing said primary hashed output code to the client device;
    (g) providing said primary hashed output code from the client device to said at least one secondary server;
    (h) comparing said primary hashed output code and said secondary hashed output code at said at least one secondary server; and
    (i) authenticating said user to said at least one secondary server based on the results thereof.

2. The method of claim 1, further comprising providing said primary hashed output code to said at least one secondary server from said primary server.

3. The method of claim 1, further comprising periodically updating said hash key.

4. The method of claim 1, wherein performing said primary hash algorithm is performed on said primary server.

5. The method of claim 1, wherein performing said secondary hash algorithm is performed on said at least one secondary server.

6. The method of claim 1, further comprising performing a system check.

7. The method of claim 1 being encoded on a non-transitory computer readable medium.

8. An efficient authentication system for primary and secondary servers for providing secure access to a user, said user providing a username and a password, said system comprising:
    (a) entering a username and password into a client device;
    (b) a primary server having a primary hash algorithm module and an authentication module, the authentication module being operable to receive the username and the password entered into the client device and to authenticate the user at the primary server based on said username and said password;
    (c) a secondary server having a secondary hash algorithm module and a hashed output compare module;
    (d) said secondary server being configured to receive a hash key and said username;

(e) said primary hash algorithm module having a hash function for generating a primary hashed output code of said username utilizing said hash key, wherein said primary server is operable to provide said primary hashed output code to said client device and said client device being operable to provide said primary hashed output code to said secondary server;

(f) said secondary hash algorithm module having said hash function for generating a secondary hashed output code of said username utilizing said hash key; and (g) said hashed output compare module being operable to compare said primary hashed output code and said secondary hashed output code whereby said user is authenticated at said secondary server based on the results thereof.

9. The system of claim 8, said primary server being operable to provide said primary hashed output code to said secondary server.

10. The system of claim 8, said secondary server being operable to receive ephemeral datum.

11. The system of claim 8, said secondary server being operable to receive optional parameters.

12. The system of claim 8, further comprising:
(a) said secondary server being operable to receive ephemeral datum;
(b) said primary hash algorithm module for performing said hash function on said username, said hash key, and said ephemeral datum to produce said primary hashed output code; and
(c) said secondary hash algorithm module for performing said hash function on said username, said hash key, and said ephemeral datum to produce said secondary hashed output code.

13. The system of claim 8, further comprising:
(a) said secondary server being operable to receive optional parameters;
(b) said primary hash algorithm module for performing said hash function on said username, said hash key, and said optional parameters to produce said primary hashed output code; and
(c) said secondary hash algorithm module for performing said hash function on said username, said hash key, and said optional parameters to produce said secondary hashed output code.

14. The system of claim 8, further comprising a system check module.

15. The system of claim 8, further comprising:
(a) a system check module;
(b) said secondary server being operable to receive primary ephemeral datum from said primary server;
(c) said secondary server having secondary ephemeral datum; and
(d) said system check module being operable to compare said primary ephemeral datum to said secondary ephemeral datum.

16. The system of claim 15, said secondary server being operable to receive said primary ephemeral datum indirectly from said primary server via a client device.

17. The system of claim 8, further comprising:
(a) a plurality of secondary servers;
(b) each of said plurality of secondary servers being operable to receive said hash key;
(c) each of said plurality of secondary servers being operable to receive said username and said primary hashed output code; and
(d) each of said plurality of secondary servers including:
  i. a secondary hash algorithm module having a hash function for generating a secondary hashed output code of said username utilizing said hash key; and
  ii. a hashed output compare module being operable to compare said primary hashed output code and said secondary hashed output code whereby said user is authenticated at said secondary server based on the results thereof.

18. The system of claim 8, further comprising:
(a) a plurality of secondary servers which include said secondary server;
(b) each of said plurality of secondary servers being operable to receive a unique hash key;
(c) said primary hash algorithm module for performing a hash function on one or more usernames which include said username and each said unique hash key to produce a unique primary hashed output code for each unique hash key;
(d) each of said plurality of secondary servers being operable to receive a respective username of said one or more usernames and said unique primary hashed output code corresponding to the received unique hash key; and
(e) each of said plurality of secondary servers including:
  i. a respective secondary hash algorithm module having a respective hash function for generating a unique secondary hashed output code of said respective username utilizing said unique hash key; and
  ii. a respective hashed output compare module being operable to compare said unique primary hashed output code and said unique secondary hashed output code whereby said user is authenticated on at least one of the secondary servers based on the results thereof.

19. An efficient authentication method for providing access to a secondary server in response to authenticating a user at a remote primary server, comprising:
(a) receiving from the remote primary server, a username for authenticating the user at the remote primary server;
(b) receiving a primary hashed output code from a client device configured for entering the username wherein the client device received the primary hashed output code from the remote primary server;
(c) providing the secondary server with a hash key;
(d) performing a hash algorithm at the secondary server on the username using the hash key to produce a secondary hashed output code;
(e) comparing the primary hashed output code and the secondary hashed output code to generate a result based on the comparison; and
(f) providing access to the secondary server based on the result.

20. The method of claim 19, wherein the primary hashed output code is generated by performing the hash algorithm on the username using the hash key.

21. The method of claim 20, wherein the primary hashed output code is generated by the remote primary server, wherein providing the secondary server with the hash key further comprises receiving the hash key from the remote primary server.

22. The method of claim 19, further comprising periodically updating the hash key at the secondary server.

23. The method of claim 19, further comprising:
(a) receiving ephemeral data from the primary server at the secondary server; and
(b) wherein performing the hash algorithm at the secondary server on the username using the hash key to produce a secondary hashed output code further comprises utilizing the ephemeral data to perform the hash algorithm.

24. A secondary server operable to provide access to a user in response to authenticating the user at a remote primary server, the secondary server comprising:
   (a) a link for a communicative relationship with the remote primary server, the link being operable to receive a username for authenticating the user at the remote primary server and a primary hashed output code of the username, wherein the link is operable to receive the primary hashed output code from a client device configured for entering the username and the client device received the primary hashed output code from the remote primary server;
   (b) a hash algorithm module for performing a hash algorithm on the username utilizing the hash key to generate a secondary hashed output code; and
   (c) a hashed output compare module for comparing the primary hashed output code and the secondary hashed output code to determine whether to provide the user access to the secondary server.

25. The method of claim 24, wherein the primary hashed output code is generated by performing the hash algorithm on the username using the hash key.

26. The method of claim 1, further comprising receiving a username, a password, and a hash key at said primary server.

* * * * *